United States Patent
Caveney

(10) Patent No.: US 7,376,734 B2
(45) Date of Patent: *May 20, 2008

(54) VOIP TELEPHONE LOCATION SYSTEM

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/366,093

(22) Filed: Feb. 13, 2003

(65) Prior Publication Data
US 2003/0154276 A1 Aug. 14, 2003

Related U.S. Application Data

(60) Provisional application No. 60/357,017, filed on Feb. 14, 2002.

(51) Int. Cl.
*G06F 15/173* (2006.01)
*G06F 15/177* (2006.01)

(52) U.S. Cl. .................... 709/224; 715/734

(58) Field of Classification Search ........... 709/223, 709/224, 238, 245; 370/245, 248; 715/734
See application file for complete search history.

(56) References Cited

U.S. PATENT DOCUMENTS

| | | |
|---|---|---|
| 3,771,098 A | 11/1973 | Dempsey |
| 4,479,228 A | 10/1984 | Crane |
| 4,767,181 A | 8/1988 | McEowen |
| 4,937,825 A | 6/1990 | Ballard et al. |
| 5,081,627 A | 1/1992 | Yu |
| 5,161,988 A | 11/1992 | Krupka |
| 5,170,272 A | 12/1992 | Onno |
| 5,185,860 A * | 2/1993 | Wu .................... 709/224 |

(Continued)

FOREIGN PATENT DOCUMENTS

EP    0 689 696    1/1996

(Continued)

OTHER PUBLICATIONS

3COM User Guide—3COM Network Jack—Model NJ200; Sep. 2002.

(Continued)

*Primary Examiner*—Ario Etienne
*Assistant Examiner*—Sargon N Nano
(74) *Attorney, Agent, or Firm*—Robert A. McCann; Zachary J. Smolinski

(57) ABSTRACT

A documentation system for a network a provided. The system has a data port and a destination device, each of which includes an electronic module with an identification code. A source device sends query signals along a network path addressed to the data port and destination device. Each of the data port and destination device electronic modules responds to the query addressed to the data port and destination device by transmitting its identification code to the source device. A processor and switch in communication with the source device direct the source device to send the query signals and to interpret the responses. The data port and destination device electronic modules powered by a local power source and patch cord. A patch cord may be adapted to provide power from the local power source both to the destination device and to the data port.

31 Claims, 6 Drawing Sheets

U.S. PATENT DOCUMENTS

| | | |
|---|---|---|
| 5,222,164 A | 6/1993 | Bass, Sr. et al. |
| 5,226,120 A | 7/1993 | Brown et al. |
| 5,233,501 A | 8/1993 | Allen et al. |
| 5,282,270 A | 1/1994 | Oppenheimer et al. |
| 5,293,635 A | 3/1994 | Faulk, Jr. et al. |
| 5,421,024 A | 5/1995 | Faulk, Jr. et al. |
| 5,437,046 A | 7/1995 | Bright et al. |
| 5,483,467 A | 1/1996 | Krupka et al. |
| 5,521,902 A | 5/1996 | Ferguson |
| 5,526,489 A | 6/1996 | Nilakantan et al. |
| 5,559,955 A | 9/1996 | Dev et al. |
| 5,568,525 A * | 10/1996 | de Nijs et al. ............... 375/356 |
| 5,572,640 A | 11/1996 | Schettler |
| 5,577,105 A | 11/1996 | Baum et al. |
| 5,606,664 A | 2/1997 | Brown et al. |
| 5,613,873 A | 3/1997 | Bell, Jr. |
| 5,636,138 A | 6/1997 | Gilbert et al. |
| 5,649,001 A | 7/1997 | Thomas et al. |
| 5,684,796 A | 11/1997 | Abidi et al. |
| 5,684,959 A | 11/1997 | Bhat et al. |
| 5,706,440 A | 1/1998 | Compliment et al. |
| 5,736,910 A | 4/1998 | Townsend et al. |
| 5,742,672 A | 4/1998 | Burk |
| 5,745,682 A | 4/1998 | Keenan |
| 5,761,281 A | 6/1998 | Baum et al. |
| 5,764,043 A | 6/1998 | Czosnowski et al. |
| 5,790,041 A | 8/1998 | Lee |
| 5,793,975 A | 8/1998 | Zeldin |
| 5,797,767 A | 8/1998 | Schell |
| 5,841,842 A | 11/1998 | Baum et al. |
| 5,847,557 A | 12/1998 | Fincher et al. |
| 5,854,824 A | 12/1998 | Bengal et al. |
| 5,870,626 A | 2/1999 | Lebeau |
| 5,898,837 A | 4/1999 | Guttman et al. |
| 5,909,429 A | 6/1999 | Satyanarayana et al. |
| 5,960,416 A | 9/1999 | Block |
| 5,994,998 A | 11/1999 | Fisher et al. |
| 6,014,667 A | 1/2000 | Jenkins et al. |
| 6,041,352 A | 3/2000 | Burdick et al. |
| 6,055,236 A | 4/2000 | Nessett et al. |
| 6,058,412 A | 5/2000 | Kojima et al. |
| 6,131,119 A | 10/2000 | Fukui |
| 6,140,911 A | 10/2000 | Fisher et al. |
| 6,152,762 A | 11/2000 | Marshall et al. |
| 6,157,925 A | 12/2000 | Jenkins et al. |
| 6,178,438 B1 | 1/2001 | Tschirhart et al. |
| 6,205,122 B1 | 3/2001 | Sharon et al. |
| 6,211,796 B1 | 4/2001 | Toms et al. |
| 6,212,206 B1 | 4/2001 | Ketcham |
| 6,222,908 B1 | 4/2001 | Bartolutti et al. |
| 6,222,910 B1 | 4/2001 | Price et al. |
| 6,224,417 B1 | 5/2001 | Belopolsky et al. |
| 6,272,541 B1 | 8/2001 | Cromer et al. |
| 6,283,775 B1 | 9/2001 | Shupe et al. |
| 6,289,370 B1 | 9/2001 | Panarello et al. |
| 6,301,340 B1 | 10/2001 | Sansom et al. |
| 6,317,597 B1 | 11/2001 | Baker et al. |
| 6,327,623 B2 | 12/2001 | Watts |
| 6,329,906 B1 | 12/2001 | Fisher et al. |
| 6,363,423 B1 | 3/2002 | Chiles et al. |
| 6,367,018 B1 | 4/2002 | Jain |
| 6,368,159 B1 | 4/2002 | Hess et al. |
| 6,377,987 B1 * | 4/2002 | Kracht ....................... 709/220 |
| 6,393,474 B1 | 5/2002 | Eichert et al. |
| 6,397,249 B1 | 5/2002 | Cromer et al. |
| 6,405,236 B1 | 6/2002 | Nieratschker |
| 6,421,322 B1 | 7/2002 | Koziy et al. |
| 6,421,376 B1 | 7/2002 | Williams et al. |
| 6,428,330 B1 | 8/2002 | Poulter et al. |
| 6,430,286 B1 | 8/2002 | Bhusri |
| 6,431,892 B1 | 8/2002 | Shupe et al. |
| 6,438,429 B1 | 8/2002 | Ho et al. |
| 6,438,695 B1 | 8/2002 | Maufer |
| 6,442,161 B1 | 8/2002 | Drummond-Murray et al. |
| 6,446,127 B1 | 9/2002 | Schuster et al. |
| 6,449,348 B1 | 9/2002 | Lamb et al. |
| 6,457,992 B2 | 10/2002 | Posey et al. |
| 6,457,993 B1 | 10/2002 | Espenshade |
| 6,483,712 B1 | 11/2002 | Oliphant et al. |
| 6,496,105 B2 | 12/2002 | Fisher et al. |
| 6,496,859 B2 * | 12/2002 | Roy et al. ................... 709/223 |
| 6,523,070 B1 | 2/2003 | Stapleton et al. |
| 6,535,983 B1 | 3/2003 | McCormack et al. |
| 6,563,824 B1 | 5/2003 | Bhatia et al. |
| 6,570,974 B1 | 5/2003 | Gerszberg et al. |
| 6,574,481 B1 | 6/2003 | Rathnasabapathy et al. |
| 6,577,622 B1 | 6/2003 | Schuster et al. |
| 6,580,697 B1 | 6/2003 | Gardner et al. |
| 6,580,785 B2 | 6/2003 | Bremer et al. |
| 6,587,454 B1 | 7/2003 | Lamb |
| 6,594,231 B1 | 7/2003 | Byham et al. |
| 6,594,707 B1 | 7/2003 | Rubinstein et al. |
| 6,601,097 B1 | 7/2003 | Cheston et al. |
| 6,603,741 B1 | 8/2003 | Poulter et al. |
| 6,611,580 B1 | 8/2003 | Dahan et al. |
| 6,614,781 B1 | 9/2003 | Elliott et al. |
| 6,614,785 B1 | 9/2003 | Huai et al. |
| 6,628,623 B1 | 9/2003 | Noy |
| 6,638,112 B1 | 10/2003 | Walker et al. |
| 6,646,656 B1 | 11/2003 | Walker et al. |
| 6,650,901 B1 | 11/2003 | Schuster et al. |
| 6,654,387 B1 | 11/2003 | Beser et al. |
| 6,657,991 B1 | 12/2003 | Akgun et al. |
| 6,665,611 B1 | 12/2003 | Oran et al. |
| 6,665,715 B1 * | 12/2003 | Houri ......................... 709/223 |
| 6,674,745 B1 | 1/2004 | Schuster et al. |
| 6,675,308 B1 | 1/2004 | Thomsen |
| 6,678,250 B1 | 1/2004 | Grabelsky et al. |
| 6,678,357 B2 | 1/2004 | Stumer et al. |
| 6,678,728 B1 | 1/2004 | Uppunda et al. |
| 6,681,252 B1 | 1/2004 | Schuster et al. |
| 6,691,147 B1 | 2/2004 | Arunkumar et al. |
| 6,691,161 B1 | 2/2004 | Cook et al. |
| 6,691,256 B1 | 2/2004 | Cook et al. |
| 6,697,339 B1 | 2/2004 | Jain |
| 6,697,354 B1 | 2/2004 | Borella et al. |
| 6,697,862 B1 | 2/2004 | Beser et al. |
| 6,704,292 B1 | 3/2004 | Valentine et al. |
| 6,711,162 B1 | 3/2004 | Ortega et al. |
| 6,717,914 B1 | 4/2004 | Hamami |
| 6,718,030 B1 | 4/2004 | Turner et al. |
| 6,751,230 B1 | 6/2004 | Vogel et al. |
| 6,753,761 B2 | 6/2004 | Fisher et al. |
| 6,754,310 B1 | 6/2004 | Steinbrenner et al. |
| 6,754,622 B1 | 6/2004 | Beser et al. |
| 6,763,001 B1 | 7/2004 | Jones et al. |
| 6,763,018 B1 | 7/2004 | Puthiyandyil et al. |
| 6,763,023 B1 | 7/2004 | Gleeson et al. |
| 6,764,343 B2 | 7/2004 | Ferentz |
| 6,880,020 B1 | 4/2005 | Rubinstein et al. |
| 7,028,087 B2 * | 4/2006 | Caveney ..................... 709/224 |
| 2001/0029534 A1 | 10/2001 | Spinks et al. |
| 2001/0047407 A1 | 11/2001 | Moore et al. |
| 2001/0056500 A1 | 12/2001 | Farber et al. |
| 2002/0021209 A1 | 2/2002 | Fisher et al. |
| 2002/0032787 A1 | 3/2002 | Overton et al. |
| 2002/0049857 A1 | 4/2002 | Farber et al. |
| 2002/0055995 A1 | 5/2002 | Beckwith et al. |
| 2002/0059416 A1 | 5/2002 | Tuunanen |
| 2002/0062366 A1 | 5/2002 | Roy et al. |
| 2002/0083426 A1 | 6/2002 | Sistla |
| 2002/0085538 A1 | 7/2002 | Leung |
| 2002/0087678 A1 | 7/2002 | Padilla |
| 2002/0089960 A1 | 7/2002 | Shuster |

| | | |
|---|---|---|
| 2002/0099787 A1 | 7/2002 | Bonner et al. |
| 2002/0101817 A1 | 8/2002 | Teixeira |
| 2002/0101818 A1 | 8/2002 | Teixeira |
| 2002/0120773 A1 | 8/2002 | Caveney |
| 2002/0121274 A1 | 9/2002 | Lee |
| 2002/0129295 A1 | 9/2002 | Nishioka et al. |
| 2002/0136360 A1 | 9/2002 | Stumer |
| 2002/0143991 A1 | 10/2002 | Chow et al. |
| 2002/0156916 A1 | 10/2002 | Watanabe |
| 2002/0161885 A1 | 10/2002 | Childers et al. |
| 2002/0171581 A1 | 11/2002 | Sheynblat et al. |
| 2002/0176386 A1 | 11/2002 | Singh |
| 2002/0182938 A1 | 12/2002 | Fuller |
| 2002/0187781 A1 | 12/2002 | Furlong |
| 2002/0188759 A1 | 12/2002 | Roy et al. |
| 2002/0188842 A1 | 12/2002 | Willeby |
| 2002/0198991 A1 | 12/2002 | Gopalakrishnan et al. |
| 2003/0014514 A1 | 1/2003 | Saito et al. |
| 2003/0014548 A1 | 1/2003 | Valentine et al. |
| 2003/0018704 A1 | 1/2003 | Polychronidis et al. |
| 2003/0041238 A1 | 2/2003 | French et al. |
| 2003/0048878 A1 | 3/2003 | Drury et al. |
| 2003/0056153 A1 | 3/2003 | Beer et al. |
| 2003/0058085 A1 | 3/2003 | Fisher et al. |
| 2003/0062991 A1 | 4/2003 | Fisher et al. |
| 2003/0067881 A1 | 4/2003 | Lunt et al. |
| 2003/0087650 A1 | 5/2003 | Arnio |
| 2003/0112965 A1 | 6/2003 | McNamara et al. |
| 2003/0115260 A1 | 6/2003 | Edge |
| 2003/0134599 A1 | 7/2003 | Pangrac et al. |
| 2003/0140277 A1 | 7/2003 | Beer et al. |
| 2003/0147412 A1 | 8/2003 | Weyman et al. |
| 2003/0154273 A1 | 8/2003 | Caveney |
| 2003/0154307 A1 | 8/2003 | Puthiyandyil et al. |
| 2003/0159066 A1 | 8/2003 | Staw et al. |
| 2003/0163581 A1 | 8/2003 | Moran et al. |
| 2003/0204356 A1 | 10/2003 | David et al. |
| 2004/0057425 A1 | 3/2004 | Brouwer et al. |
| 2004/0073597 A1 | 4/2004 | Caveney et al. |

FOREIGN PATENT DOCUMENTS

| | | | |
|---|---|---|---|
| EP | 1 152 569 A3 | 11/2001 | |
| EP | 1 422 884 A1 | 5/2004 | |
| FR | 2 680 067 A1 | 2/1993 | |
| GB | 2 236 398 A | 4/1991 | |
| WO | WO 98/03921 | 1/1998 | |
| WO | WO 00/60475 | 10/2000 | |
| WO | WO 01/65763 A2 | 9/2001 | |
| WO | WO 02/10942 A1 | 2/2002 | |
| WO | WO 02/47331 A2 | 6/2002 | |
| WO | WO 02/076018 A2 | 9/2002 | |

OTHER PUBLICATIONS

Avaya Solving the Challenges of E911 Service with Avaya IP Telephony Networks; Nov. 2002.
Trends 911 over VoIP: whose responsibility?—Communications News; Jul. 2004.
Panduit—Discover the PANVIEW Solution; Jul. 2003.
3COM NJ200 Network Jack Management Feature: Location Mapping; Sep. 2003.
3COM Solution Case Studies: University of Utah Hospital.
3COM Product Details—3COM NBX 100 Communications System.
3COM Unveils Next Generation of Internet Protocol Business Phone—Press Release; Mar. 4, 2004.
3COM Product Details—3COM Network Jack & IntelliJack Switch Family Overview.
3COM Application Guide—Expanding User Connectivity in Education; Feb. 2004.
3COM Data Sheet—3COM Network Jacks; Dec. 2003.
3COM Small Office Solutions—A Guide to Small Office Networking; Sep. 2003.
3COM and Siemon to Deliver World-Class Connectivity—Press Release; Apr. 13, 2004.
3COM Product Details—3COM SuperStack 3 NBX Networked Telephony Solution.
3COM Product Details—3COM Guardian Service.
3COM Product Details—3COM Power over Ethernet Multiport Midspan Solution.
3COM Product Details—3COM Network Jack NJ200.
U.S. Appl. No. 10/910,899, filed Aug. 3, 2004, Caveney et al.
U.S. Appl. No. 10/969,863, filed Oct. 22, 2004, Caveney.
U.S. Appl. No. 10/997,600, filed Nov. 23, 2004, Caveney et al.
Cisco "Catalyst Inline Power Patch Panel"Data Sheet; May 2000.

* cited by examiner

VOIP TELEPHONE LOCATION SYSTEM

CROSS-REFERENCE TO RELATED APPLICATIONS

This application is claiming priority to the previously filed U.S. provisional patent application Ser. No. 60/357,017, filed Feb. 14, 2002, entitled "VOIP Telephone Location System," incorporated herein by reference in its entirety.

BACKGROUND OF THE INVENTION

As communication network utilization and technology continues to escalate, the typical local area network (LAN) is simultaneously growing larger and denser, and it is increasingly desirable and advantageous to continuously document the physical paths of network interconnections and the physical locations of network components, including network connectors or ports in such paths and destination devices, e.g., personal computers or telephones, including Voice Over Internet Protocol (VOIP) telephones.

Such a documentation system provides many advantages, including facilitating the planning and revision processes, the determination of the location of the physical area of a discontinuity in the network path, and the determination of the physical locations of destination devices such as VOIP telephones. It is important that the documentation system be supported with reliable power to destination devices and electronic identification modules which identify the destination devices and/or ports to which they are attached.

SUMMARY OF THE INVENTION

There is provided a documentation system for a network having a source device which is connected to at least one destination device through at least one intermediate network path element. The source device has the capability to transmit a query signal directed to any destination device to which it is connected and each destination device has the capability to send a response signal containing its identification code back to the source device. In addition, the source device has the capability to transmit a query signal directed to any intermediate network path element which has a physical location in a designated zone, and an electronic module in the intermediate network path element has the capability to return a response signal containing its identification code back to the source device. A power supply is provided for providing power to electronic identification modules within destination devices and within ports to which the destination devices are attached. The source may be adapted to re-send a query signal if one or more response signals are not received. According to one embodiment of the invention, powered electronic identification modules are provided both within destination devices and within ports to which the destination devices are connected, though it is contemplated that powered electronic modules may be provided only within destination devices or only within ports to which the destination devices are connected. The electronic identification modules may be Media Access Controller modules ("MAC modules"), with identification codes being MAC addresses.

The network documentation system utilizes software to direct the source device to sequentially send query signals directed to destination devices to which it is connected and to intermediate network path elements in each designated zone to which it is connected. The response signals are interpreted by the software to document the network configuration.

DETAILED DESCRIPTION OF THE ILLUSTRATED EMBODIMENTS

Figure 1:
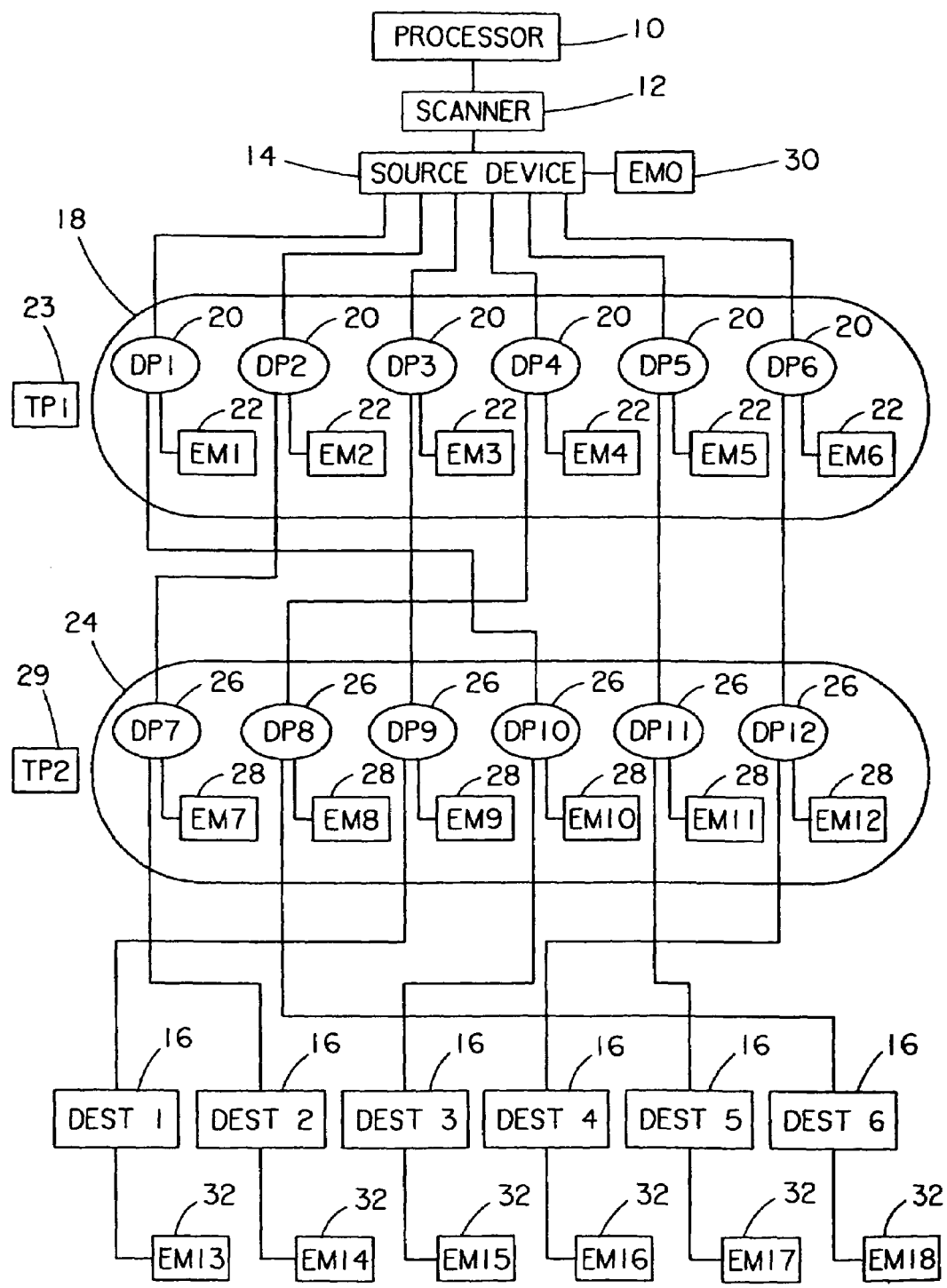
FIG. 1 is a schematic view of a documentation system in accordance with a first embodiment of the invention.

The invention is directed to apparatus and methods which automatically provide documentation of a network system, hereinafter called "the system." This description incorporates by reference in their entireties previously filed U.S. patent application Ser. No. 10/060,608, filed Jan. 30, 2002, entitled "Network Documentation System With Electronic Modules," along with prior filed applications Ser. No. 60/270,811, filed Feb. 23, 2001, and No. 60/297,289, filed Jun. 11, 2001, both entitled "Apparatus And Method For Efficient Network Reconfiguration" and incorporated by reference therein in their entireties. This description further incorporates by reference in its entirety previously filed U.S. provisional patent application Ser. No. 60/352,826, filed Jan. 30, 2002, entitled "Network Documentation System With Electronic Modules."

To improve the accuracy, efficiency and capability of documenting a network system, electronic modules are placed into electronic communication networks with corresponding ports or nodes of the network such that connecting apparatus, connecting the respective ports or nodes to a source device, also provide a mechanism by which query and response signals may be routed between the source device and the connected ports or nodes in the system in the same manner that data signals may be transmitted between them. The signals may be transmitted over the same or a different medium from the data signals (e.g., common or separate wire or fiber). The electronic modules have associated identification elements that may have a single component or multiple components, and the modules are capable of receiving and recognizing query signals directed to them and responding by transmitting their identification code back to the source device. Thus, the system may utilize signals directed toward and received from all of the respective data ports or nodes in the system and thereby formulate a "map" of the entire system as it is physically configured.

In State of the Art documentation systems, such as the HP Openview System, and/or Element Management Systems, such as Cisco Works, a source device, i.e. a switch, sends a query signal through one designated network path that causes any destination device, i.e. a personal computer, that receives the query to transmit a response signal containing its identification code to the source device.

The inventive documentation and fault detection system contemplates the preferable use of electronic modules in every final destination device within a network, as well as in every network port which connects the source device to the final destination devices. Documentation systems and methods according to the present invention may be employed in Ethernet networks, including switched Ethernet networks. Each module can receive a query signal from a source, e.g., a switch, and ascertain whether the signal is directed to it by the use of identification codes. In a preferred embodiment of the invention, each electronic module which is in a designated physical location zone within the system has a unique zone address code. In some preferable embodiments of the invention, the ports and their corresponding modules may be stratified into "zones" based on their relative proximity, in an electrical or communications sense, to the source device and/or the final destination device. In these embodiments, since each signal ultimately travels only along one path given a particular network configuration, every port/module within a particular zone has the same zone addressing information, however each module retains a unique identification code which is transmitted to the source device in response to a query directed to it.

For example, a typical network may include a pair of patch panel ports for cross-connecting between a source and one or more destinations. In such an arrangement, the group of patch panel ports (and the electronic modules contained therein) closer to the source from a communications standpoint (i.e., the signal path direction) would be classified as zone 1. The next group of ports/modules along the signal path (i.e., the patch panel ports closer to the destination devices) would be classified as zone 2 in this example. The destination devices would be classified as zone 3.

The source sequentially sends a signal along respective output paths directed to any module along the path having a specified zone address. The one module in such zone along each respective path then, in turn, transmits back to the source when it receives the signal intended for its zone. The return signal includes the identification code of the module returning the signal. Using this procedure and information previously known to the documented system (e.g., the physical location of each port as identified by the unique identification codes thereof), the system can map (i.e. document) which ports and destination devices are connected along any particular signal path.

Each electronic module in the system would require a power supply which, in various embodiments of the invention, could be provided by a pair of conductors which could also be signal pairs or a battery. In a network system employing twisted wire pairs for carrying signals, the system could use one or more of the signal pairs to receive and transmit signals to and from particular electronic modules, including those associated with particular destination devices, sources, and network ports there between from a communications standpoint. A fiber optic or other LAN system could incorporate two conductors in each cable to be adapted for the same purpose.

As seen in FIG. 1, in a preferred embodiment of the invention, a computer or processor 10 is connected to a switch 12. At the direction of the processor, the switch may periodically or on-demand poll one or more of the data ports in the system to ascertain information about the ports. Alternatively or additionally, this polling may be accomplished using a software module provided on a computer or processor. Such polling may occur on a zone-by-zone basis, with the source device sequentially sending a signal, such as a query signal, along respective output lines directed to any electronic module along the path having the specified zone address. The identified module may then return its identification code back to the source. In this manner, the entire system may effectively be mapped (i.e., documented). The switch may preferably be in communication with a source device 14 and one or more destination devices 16.

A first zone 18 of data ports 20 may preferably be congregated on a single patch panel or network rack, and each of the data ports 20 is electrically connected directly with the source device 14. Each of the data ports 20, identified as "DP" in the figures, has an electronic module 22, identified as "EM" in the figures, in electrical communication therewith. Preferably, the first zone 18 of data ports includes a test port 23 disposed proximately thereto for permitting connection of a test plug. A second zone 24 of data ports 26 may also be congregated on another patch panel or network rack, and each of the data ports 26 is electrically connected directly with one of the destination devices 16. Each of the data ports 26 has an electronic module 28 in electrical communication therewith. Preferably, the second zone 24 of data ports includes a test port 29 disposed proximately thereto for permitting connection of a test plug. Additionally, the source device 14 preferably includes an electronic module 30 in electrical communication therewith and the destination devices 16 each include an electronic module 32 in electrical communication therewith. In FIG. 1, connective lines represent possible electrical connections that may be achieved by the use of patch cords and cables, and an exemplary system having six destination devices connected to a source device is shown.

Figure 2:
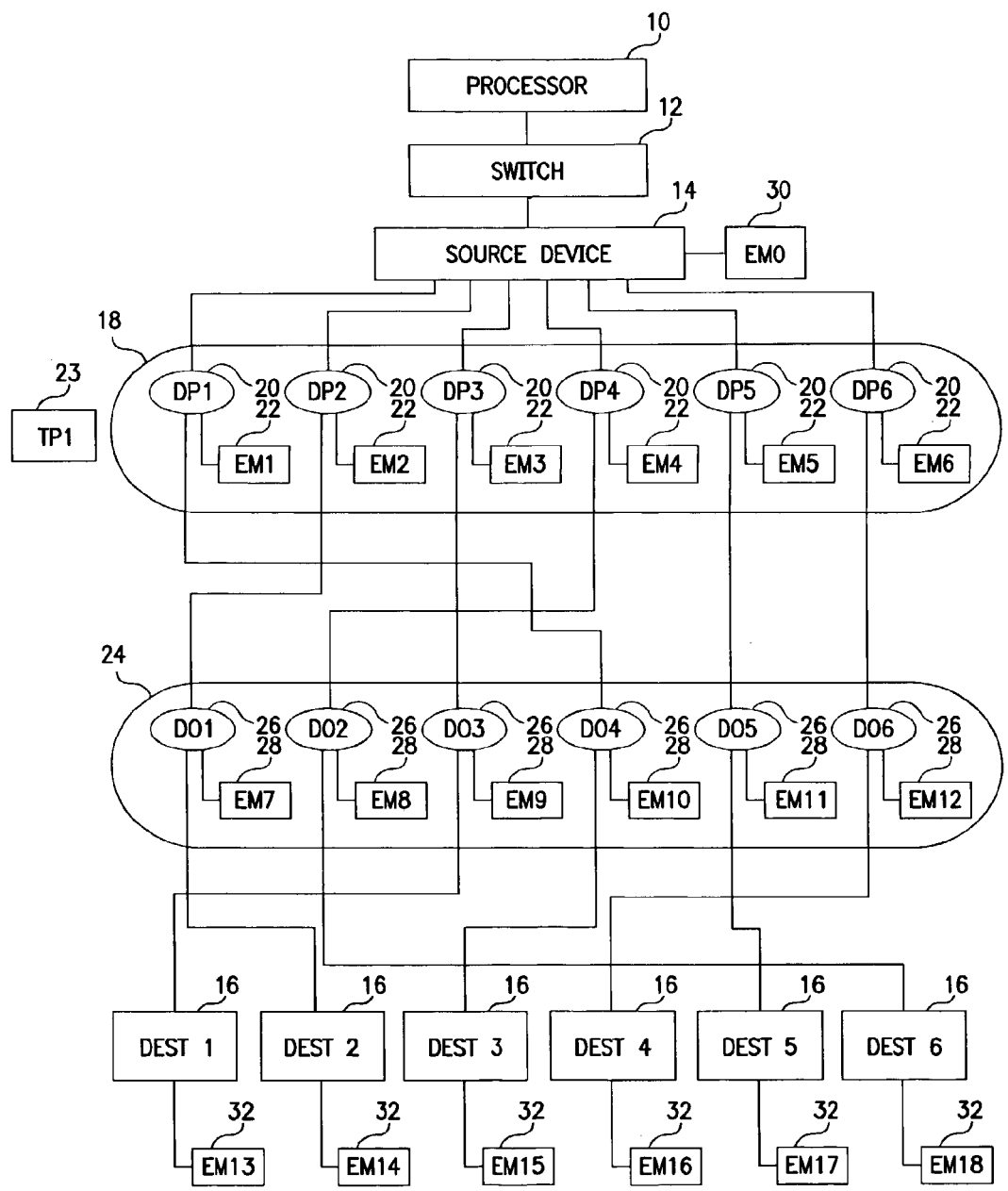
FIG. 2 is a schematic view of a documentation system in accordance with a second embodiment of the invention.

FIG. 2 illustrates an interconnect configuration wherein the first zone 18 is a patch panel and the second zone 24 are the outlet ports (e.g., wall outlet jacks) to which the destination devices are connected. According to one embodiment of the present invention, the destination devices may be provided with state of the art electronic modules with common address codes and unique identification codes.

The outlet ports are identified as "DO" in FIG. 2. The destination outlets, while not qualitatively different than the data ports 7-12 of FIG. 1, are disposed proximately to the destination devices 16 to which they are connected. This provides the benefit of knowing approximately where a particular destination device is physically located based on its proximity to a destination outlet which is fixed in the physical world. Thus, by focusing on the identification code of the electronic module of the particular destination outlet, rather than that of the destination device itself, the approximate location of the destination device may be ascertained by the system.

Among the many benefits of the invention is the ability to completely map out a particular network configuration. In status quo systems, when a source and destination are no longer in communication, it cannot generally be easily determined which link in the pathway that connects them is the problematic link. In the present invention, each intersection, i.e., LAN port, has associated with it an electronic module having a zone address code, and because response signals from a particular electronic module include the identification code of the module, pathways from a source to a destination can be more clearly identified on a link-by-link or zone-by-zone basis. Physical locations of ports and destination devices and revision instructions can be more efficiently determined for a particular reconfiguration.

In various embodiments of this invention, this same query signal also causes one or a plurality of ports which contain electronic modules along said network path to add its response containing its identification code as a suffix or a series of suffixes to the response from the destination device or the various responses could be received in any order.

In one embodiment, only the port to which the destination device is connected to is equipped with an electronic module. This electronic module responds to a query from the source device after a pre-set time delay which is long enough for the response from the destination device to have occurred. The source device therefore receives the response from the destination device followed by the response from said port.

In a similar embodiment, additional electronic modules are located in ports in specified zones in the network path between said port and the source device and each zone electronic module has a designated time delay to correspond to its designated zone. In this manner, the entire path between the switch and ultimate device can be documented.

In another embodiment, only the port to which the destination device is connected is equipped with an electronic module. Said electronic module receives the query followed by the response from the destination device or it receives only the response from the destination device and it sends its response containing its identification code.

In a similar embodiment, additional electronic modules are located in ports in specified zones in the network path. These electronic modules receive the query followed by the response from the destination device or they receive only the response from the destination device followed by the successive responses from each of said ports which are closer to the destination device along the network path than it is and it then sends its response containing its identification code.

In another embodiment, only the port to which the destination device is connected is equipped with an electronic module which responds immediately with its identification code when a query from the source device is received. Subsequently, the destination device responds to the source query with its identification code.

In another embodiment, only the port to which the destination device is connected is equipped with an electronic module which responds with its identification code after a query from the source device is received. The destination device responds to the same query with its identification code after it is received. The above two identification codes could be received in any order. If there is a collision of signals and both responses are not received by the source device, the query is repeated.

In a similar embodiment, only the port to which the destination device is connected is equipped with an electronic module which receives and stores the responses from the destination device. It then sends its total response which includes the response from the destination device plus its identification code.

In a similar embodiment, each electronic module receives and stores the responses from the destination device and the responses from all electronic modules for each said port which is closer to the destination device along the network path than it is. It then sends its total response which includes said stored responses followed by its individual response containing its identification code.

In another embodiment, the port to which the destination device is connected is equipped with an electronic module. In response to an inquiry from the source device, an electronic module in the destination device sends an inquiry to the electronic module in the port and it responds to the destination device with its identification code. The destination device then responds to the source device with its identification code followed by the port identification code.

An application of the above embodiments is a VOIP telephone wherein it is desirable to know the physical location of the telephone in the event an emergency 911 call is made from the telephone. While the physical location of the telephone can be changed, the physical location of the port to which it is connected is known if the port's identification code is known. Therefore, the physical location of an emergency call made with any telephone connected to a particular port is known by the identification code associated with said port, with the port's identification code transmitted with each telephone call from a VOIP phone. Associations between identification codes and specific ports may be recorded in a table or map containing physical locations along with identification codes of ports at the physical locations. The physical location of each port may be fixed and documented in a software system which provides the physical location of a particular telephone which is connected to a port. In systems and methods according to some embodiments of the present invention, the software system may be adapted to communicate the physical location from which an emergency 911 call is made.

Although any known manner for providing power to an electronic identification module may be employed and would be considered to be within the scope of this invention, one manner that is specifically contemplated by the above referenced application is where the same local source of electrical power that provides power for a VOIP telephone provides power for the electronic identification module contained in the port to which the VOIP telephone is connected.

Figure 3:
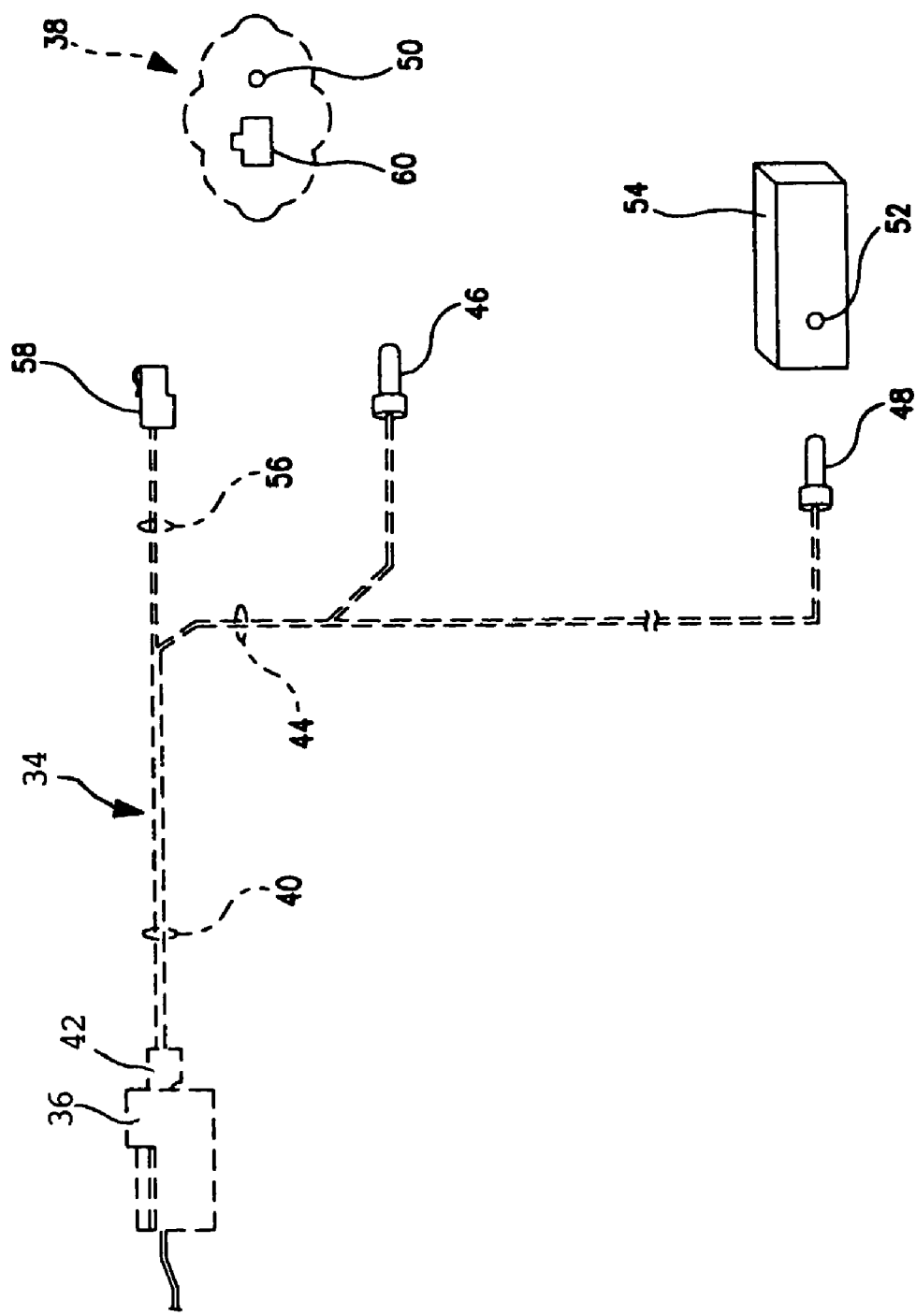
FIG. 3 is a schematic view of a power supply system in accordance with one embodiment of the present invention.

One embodiment of the present invention provides a communication and power patch cord that interconnects a local port to a VOIP telephone and also supplies the power to both the telephone and the port electronic module. As can be seen in FIG. 3, in one embodiment of the invention a patch cord 34 interconnects a local port 36 to a VOIP telephone 38. The patch cord 34 has ten conductors 40 at the local port 36 end, which includes eight signal conductors and two power conductors that are terminated in a ten-conductor jack 42. Nearer the telephone end the two power conductors 44 break out from the patch cord 34 and are terminated in parallel with first and second DC power plugs 46 and 48. The first DC power plug 46 connects to a power port 50 on the VOIP telephone 38 and the second DC power plug 48 connects to a power port 52 on a local power supply 54. Eight signal conductors 56 of the patch cord 34 are terminated in an 8-conductor jack 58 which connects to the signal port 60 of the VOIP telephone 38.

Use of the patch cord 34 ensures that if the VOIP telephone 38 has local power and is operational, the local port 36 also has power.

Figure 4:
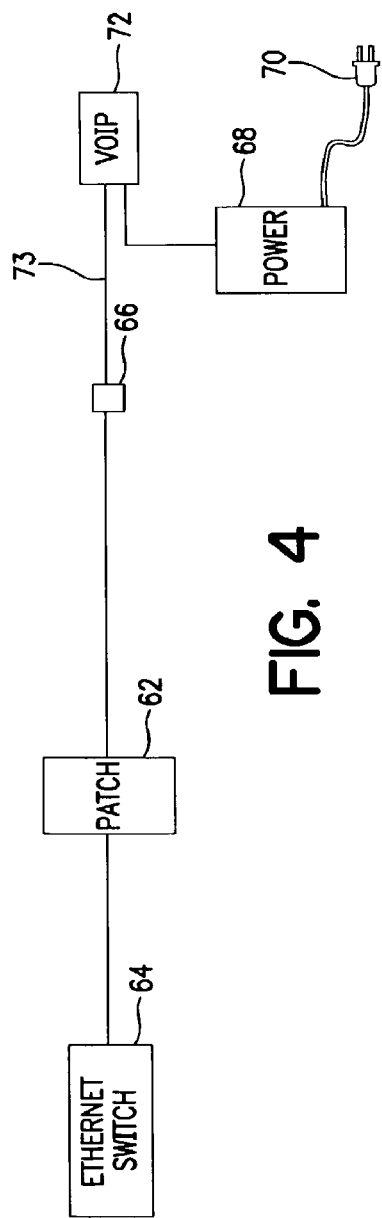
FIG. 4 is a schematic view of a power supply system in accordance with another embodiment of the present invention.

Alternative embodiments of the present invention allow for power to be supplied to a port and a destination device connected to the port. In the embodiment shown in FIG. 4, a patch panel 62 is provided between an Ethernet switch 64 and a port 66. A local power source 68, which may receive power from an AC cord 70, is connected to a VOIP phone 72 to provide power thereto. The VOIP phone, in turn, is connected to the port 66 with a cord 73 adapted to transmit both power and data from the VOIP phone 72 to the port 66.

Figure 5:
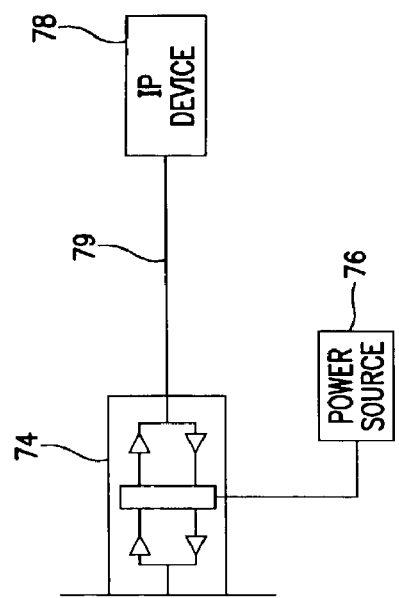
FIG. 5 is a schematic view of a power supply system in accordance with another embodiment of the present invention.

FIG. 5 shows an alternative embodiment in which a port 74 is powered by a power source 76, with the port 74 adapted to supply power to an Internet Protocol device 78, which may be a VOIP phone, along a power-and-data connector 79.

Figure 6:
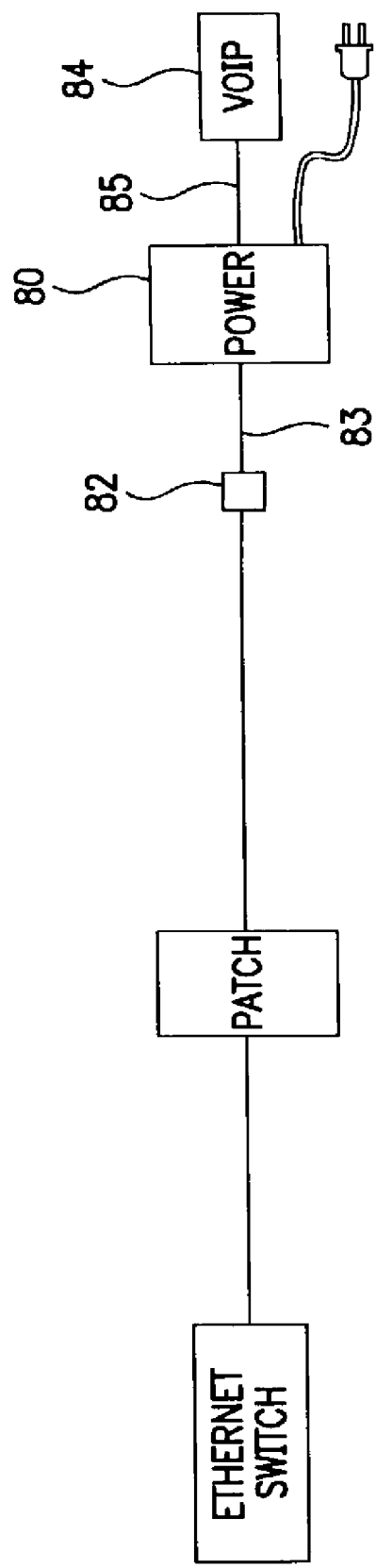
FIG. 6 is a schematic view of a power supply system in accordance with another embodiment of the present invention.

Turning now to FIG. 6, an embodiment is shown in which a power supply 80 supplies power to a port 82 and a VOIP phone 84 using two separate connectors 83 and 85, each adapted to supply power and also to pass data between the port 82 and the VOIP phone 84, with data passing through the power adapter 80.

Figure 7:
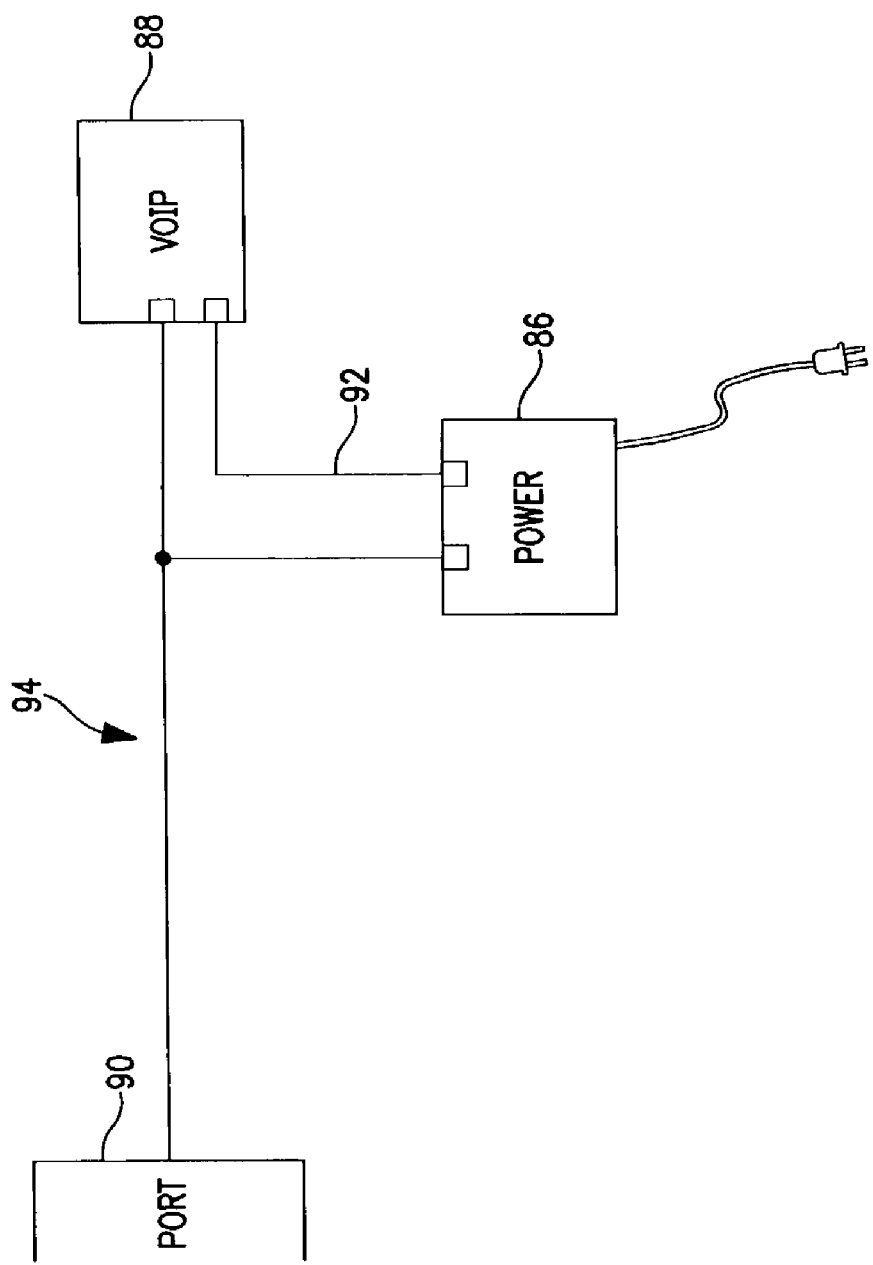
FIG. 7 is a schematic view of a power supply system in accordance with another embodiment of the present invention.

In FIG. 7, an embodiment is shown in which a power supply 86 supplies power to a VOIP phone 88 and to a port 90 using two different cords. A VOIP power cord 92 provides a power connection between the power supply 86 and the VOIP phone 88, and a port power and data patch cord 94 provides power to the port 90 and also provides a data connection between the port 90 and the VOIP phone 88.

An advantage of documentation systems according to some embodiments of the present invention is that they can be attained by adding said electronic modules and altering the software of said State of the Art documentation systems. The generation of any additional query signals to those generated by said State of the Art system is not required.

It should be noted that the above-described invention contemplates many embodiments not specifically described, and the explicitly described embodiments should be considered to be exemplary rather than definitional. As an example of an alternative not specifically described, without limitation or exclusion, the present invention may be employed in a network system having a distinct indicator, such as an LED, adjacent some or all of the LAN ports in the network. Such indicators may then be used to assist the revisor in identifying LAN ports requiring the insertion or removal of a cord plug.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A documentation system for locating devices within a network having a source device which is connected to at least one network path having a destination device attached thereto, said system comprising:
    a physical port which includes an physical electronic module with an identification code on said at least one network path;
    said destination device including an physical electronic module with an identification code;
    a local power source providing power to said electronic module of said port and to said electronic module of said destination device;
    said source device having the capability to send a query signal along said at least one network path addressed to said port and said destination device corresponding to said at least one network path;
    said electronic module corresponding to said port responding to said query addressed to said port using a port transmission containing the identification code corresponding to the port to be transmitted to said source device; and
    said electronic module of said destination device responding to said query addressed to said destination device using a destination device transmission containing the identification code corresponding to the destination device to be transmitted to said source device.

2. The documentation system of claim 1 wherein said port is a patch panel port.

3. The documentation system of claim 1 wherein said port is an outlet port directly connected to said destination device.

4. The documentation system of claim 3 wherein said outlet port is a wall outlet jack.

5. The documentation system of claim 1 wherein said source device is adapted to resends said query signal if both said port transmission and said destination device transmission are not received at said source device.

6. The documentation system of claim 1 wherein said local power source is a power adapter,the system further comprising a power patch cable conveying power to said electronic module of said destination device and said electronic module of said port.

7. The documentation system of claim 1 wherein said local power source is proximate to said destination device.

8. The documentation system of claim 1 wherein said local power source is proximate to said port.

9. A documentation system for a network having a source device connected to a plurality of network paths, said documentation system comprising:
    a physical port corresponding to at least one of said network paths;
    a destination device coupled to said port along said at least one network path;
    a physical electronic module associated with said port, said electronic module having an identification code;
    a physical electronic module associated with said destination device, said electronic module associated with said destination device having an identification code;
    a transmitter associated with said source device transmitting query signals along respective ones of said network paths;
    a receiver associated with said source device receiving response signals from said respective ones of said network paths; and
    a local power source providing power to said electronic module of said port and to said electronic module of said destination device.

10. The documentation system of claim 9 wherein said port is a patch panel port.

11. The documentation system of claim 9 wherein said port is an outlet port.

12. The documentation system of claim 11 wherein said outlet port is a wall outlet jack.

13. The documentation system of claim 9 wherein said source device is adapted to resends said query signal if both said port transmission and said destination device transmission are not received at said source device.

14. The documentation system of claim 9 wherein said local power source is a power adapter, the system further comprising a power patch cable conveying power to said electronic module of said destination device and said electronic module of said port.

15. The documentation system of claim 9 wherein said local power source is proximate to said destination device.

16. The documentation system of claim 9 wherein said local power source is proximate to said port.

17. A method for identifying and locating devices within a network comprising:
    sending a query from a source device along a network path having a physical port in communication with said source device and a destination device connected to said port, said port having a port electronic module associated therewith, said destination device having a destination device electronic module associated therewith, each of said electronic modules being a physical module and having an identification code associated therewith;

providing power to said electronic module associated with said port and to said electronic module associated with said destination device using a local power source;

receiving said query at said port;

responding to said query by sending, from said port to said source device, a port response signal containing said identification code associated with said port electronic module;

receiving said query at said destination device;

responding to said query by sending, from said destination device to said source device, a destination device response signal containing said identification code associated with said destination device electronic module; and monitoring said port response signal and said destination device response signal at said source device.

18. The method of claim 17 wherein said step of responding to said query by sending said port response signal is completed before said step of responding to said query by sending said destination device response signal.

19. The method of claim 17 wherein said step of responding to said query by sending said destination device response signal is completed before said step of responding to said query by sending said port response signal.

20. The method of claim 17 wherein said port is a patch panel port.

21. The method of claim 17 wherein said port is a wall outlet jack.

22. The method of claim 17 wherein said local power source is proximate to said destination device.

23. The method of claim 17 wherein said local power source is proximate to said port.

24. A network documentation system comprising:

a source device adapted to send a query signal;

a network path adapted to carry said query signal;

a physical port along said network path, said port comprising a port electronic module that is physical and that stores a port identification code associated with said port, said port electronic module adapted to respond to said query signal by sending to said source device, along said network path, a port response signal comprising said port identification code;

a destination device in communication with said port, said destination device comprising a destination device electronic module that is physical and that stores a destination device identification code associated with said destination device, said destination device electronic module responding to said query signal by sending to said source device, along said network path, a destination device response signal comprising said destination device identification code;

a local power source providing power to said port electronic module and said destination device electronic module; and a patch cord conveying said power from said local power source to said port electronic module and to said destination device electronic module.

25. The network documentation system of claim 24 wherein said port is located in a patch panel.

26. The network documentation system of claim 24 wherein said port is an outlet port connected to said destination device.

27. The network documentation system of claim 26 wherein said outlet port is a wall outlet jack.

28. The network management system of claim 24 wherein said destination device is a voice-over-internet-protocol phone.

29. The network management system of claim 24 wherein said source device is adapted to resends said query signal if no response signals are received at said source device following a query.

30. The documentation system of claim 24 wherein said local power source is proximate to said destination device.

31. The documentation system of claim 24 wherein said local power source is proximate to said port.

* * * * *

UNITED STATES PATENT AND TRADEMARK OFFICE
CERTIFICATE OF CORRECTION

PATENT NO. : 7,376,734 B2 Page 1 of 1
APPLICATION NO. : 10/366093
DATED : May 20, 2008
INVENTOR(S) : Jack E. Caveney It is certified that error appears in the above-identified patent and that said Letters Patent is hereby corrected as shown below:

On the Title Page under (56), References Cited, insert the following documents that have not been printed on the granted patent:

-- 2003/0046390 A1    06/2003   Ball et al.
   2004/0184584 A1    09/2004   McCalmont et al.
   WO 02/080311 A1    10/2002 --

Col. 7, line 43, change "an physical electronic" to -- a physical electronic --.

Col. 7, line 46, change "an physical electronic" to -- a physical electronic --.

Col. 8, line 7, change "is adapted to resends" to -- resends --.

Col. 8, line 47, change "is adapted to resends" to -- resends --.

Col. 10, line 32, change "device is adapted to resends" to -- device resends --.

Signed and Sealed this

Seventh Day of October, 2008

JON W. DUDAS
*Director of the United States Patent and Trademark Office*